United States Patent
Umeda et al.

(10) Patent No.: US 8,010,161 B2
(45) Date of Patent: Aug. 30, 2011

(54) SCHEDULING METHOD AND RADIO BASE STATION

(75) Inventors: Masataka Umeda, Kanagawa (JP); Hiromu Matsuzawa, Kanawaga (JP)

(73) Assignee: Fujitsu Limited, Kawasaki (JP)

(*) Notice: Subject to any disclaimer, the term of this patent is extended or adjusted under 35 U.S.C. 154(b) by 385 days.

(21) Appl. No.: 12/200,358

(22) Filed: Aug. 28, 2008

(65) Prior Publication Data

US 2009/0186621 A1    Jul. 23, 2009

(51) Int. Cl.
    *H04M 1/00*    (2006.01)
(52) U.S. Cl. ............ 455/561; 455/418; 455/422.1; 455/450; 455/451; 455/452.1; 455/452.2; 455/453; 455/67.11; 455/500; 455/509; 455/512; 455/513; 455/514; 455/550.1; 455/556.2; 370/252; 370/328; 370/329; 370/343; 370/344; 370/346; 370/347; 370/348; 370/349
(58) Field of Classification Search .......... 455/418, 455/422.1, 453, 450, 451, 452.1, 452.2, 67.11, 455/500, 509, 512, 513, 514, 550.1, 556.2, 455/561; 370/252, 328, 329, 343, 344, 346, 370/347, 348, 349
See application file for complete search history.

(56) References Cited

U.S. PATENT DOCUMENTS

| | | | |
|---|---|---|---|
| 2003/0128658 A1* | 7/2003 | Walton et al. | 370/208 |
| 2006/0056340 A1* | 3/2006 | Hottinen et al. | 370/328 |

FOREIGN PATENT DOCUMENTS

| | | |
|---|---|---|
| JP | 2004-159345 | 6/2004 |
| JP | 2007-235201 | 9/2007 |
| WO | 2008/004299 | 1/2008 |

OTHER PUBLICATIONS

IEEE Std 802.16(tm)—2004.
IEEE Std 802.16e(tm)—2005.
Samsung, "Flexible Fractional Frequency Reuse Appro," 3rd Generation Partnership Project TSG-RAN WG1, R1-051341, 8.2, Nov. 2005.

* cited by examiner

*Primary Examiner* — Nick Corsaro
*Assistant Examiner* — Amanuel Lebassi
(74) *Attorney, Agent, or Firm* — Myers Wolin, LLC.

(57) ABSTRACT

A radio base station for performing communication through three or more frequency bands based on orthogonal frequency division multiplexing includes a transmission unit configured to transmit a first channel through at least one of the three or more frequency bands and to transmit a second channel having smaller power than the first channel through at least another one of the three or more frequency bands, the first channel and the second channel being transmittable concurrently in time, a reception condition detecting unit configured to detect a reception condition of one or more mobile stations residing within a local cell, and a scheduling unit configured to select one of the first channel and the second channel, a modulation scheme, and a transmission power to be used for at least a downlink to one of the mobile stations based on the detected reception condition.

12 Claims, 13 Drawing Sheets

FIG.6

| MS | DOWNLINK $CINR_{1R}$ | DOWNLINK $CINR_{3R}$ | DOWNLINK $CINR_{Pilot}$ | UPLINK $CINR_{Pilot}$ | FFR ZONE | ACK/NACK | MCS | NACK RATE(%) |
|---|---|---|---|---|---|---|---|---|
| MS#1 | 3dB | 17dB | 10dB | 10dB | PRIORITY A | NACK | QPSK(1/2) | 10 |
| MS#2 | 5dB | 19dB | 15dB | 15dB | NON-PRIORITY B | ACK | 16QAM(1/2) | 5 |
| ⋮ | | | | | | | | |
| ⋮ | | | | | | | | |
| MS#n | 9dB | 23dB | 20dB | 21dB | PRIORITY A | ACK | 16QAM(1/2) | 5 |

FIG.9

| REQUIRED CINR | MODULATION SCHEME | REPETITION |
|---|---|---|
| $CINR_0$ | 16QAM CTC R=2/3 | 1 |
| $CINR_1$ | 16QAM CTC R=1/2 | 1 |
| $CINR_2$ | QPSK CTC R=2/3 | 1 |
| $CINR_3$ | QPSK CTC R=1/2 | 1 |
| $CINR_4$ | QPSK CTC R=1/2 | 2 |
| $CINR_5$ | QPSK CTC R=1/2 | 4 |

SCHEDULING METHOD AND RADIO BASE STATION

CROSS-REFERENCE TO RELATED APPLICATIONS

The present application is based upon and claims the benefit of priority from the prior Japanese Patent Application No. 2008-007835 filed on Jan. 17, 2008, with the Japanese Patent Office, the entire contents of which are incorporated herein by reference.

BACKGROUND OF THE INVENTION

1. Field of the Invention

The disclosures herein relate to a scheduling method and a radio base station. The disclosures herein relate to a radio communication system using orthogonal frequency division multiplexing in which radio frequency resources are divided into three or more communication channels.

2. Description of the Related Art

In mobile communication systems utilizing OFDM (orthogonal frequency division multiplexing), the simultaneous use of overlapping radio frequency resources by adjacent cells causes mutual interference. Frequency allocation thus needs to ensure that different frequency resources are allocated to adjacent cells.

It is practically impossible, however, to divide frequency resources into a large number of resource portions that are fixedly allocated to respective cells in such a manner thus all the cells use different frequency resources. It is thus common to allow nonadjacent cells to repeatedly use overlapping frequency resources, thereby making recycling use of frequency resources.

In such frequency allocation system, FFR (fractional frequency reuse) has been attracting attention as a means to achieve further improvement in frequency utilization. FFR allows a frequency reuse distance to vary in response to the distance between a mobile station and a radio base station. As the mobile station moves farther away from the base station (thus suffering increased interference), the frequency reuse distance is increased to prevent interference between adjacent cells. As the mobile station moves closer to the base station (thus suffering less interference), the frequency reuse distance is decreased to improve frequency utilization. This arrangement is aimed at improving frequency utilization for the system as a whole.

Non-patent Document 1 discloses using FFR together with transmission power control for the purpose of further improving frequency utilization.

In this system, when a mobile station is situated far away from a radio base station (thus suffering large interference), a frequency band (priority channel) that is different from those of the adjacent cells is used. When the mobile station is situated close to the radio base station (thus suffering small interference), transmission power is reduced so as not to interfere with the adjacent cells, and a frequency band (non-priority channel) that is used by an adjacent cell is allocated. In this manner, transmission power is reduced to suppress interference with adjacent cells, thereby making it possible to use a frequency band that would not be used in a conventional system. With this arrangement, frequency utilization can be improved.

Further, Patent Document 1 discloses changing a frequency reuse distance in response to the distance between a mobile station and a radio base station in the FFR in which a default frequency reuse distance is 3. The frequency band is divided into four communication channels. Among these, three communication channels are used in a region where a frequency reuse distance is set equal to 3 for mobile stations situated near the edge of the cell, and the one remaining communication channel is used in a region where a frequency reuse distance is set equal to 1 for mobile stations situated near the center of the cell. With such provision, frequency utilization is improved while avoiding quality degradation caused by interference.

Patent Document 2 discloses dividing a cell into a center area and a surrounding area in a concentric fashion and suppressing transmission power to such a degree that the center area does not interfere with the adjacent cells when the same frequency is used in the cell of interest and the adjacent cells.

With regard to the allocation of a non-priority channel, Non-patent Document 1 only describes setting the transmission power to a level that does not affect the adjacent cells. No disclosure is given with respect to a method of controlling interference between the priority channel and the non-priority channel. Because of this, it is not possible to determine an optimum modulation and coding scheme (MCS), resulting in a drop of throughput.

There is thus a need for a scheduling method and a radio base station in which a suitable modulation and coding scheme can be selected for each mobile station to improve throughput.

[Patent Document 1] Japanese Patent Application Publication No. 2004-159345

[Patent Document 2] Japanese Patent Application Publication No. 2007-235201

[Non-patent Document 1] Samsung, "Flexible Fractional Frequency Reuse Appro," 3rd Generation Partnership Project TSG-RAN WG1, R1-051341, 8.2, November 2005

SUMMARY OF THE INVENTION

According to one embodiment, a radio base station for performing communication through three or more frequency bands based on orthogonal frequency division multiplexing includes a transmission unit configured to transmit a first channel through at least one of the three or more frequency bands and to transmit a second channel having smaller power than the first channel through at least another one of the three or more frequency bands, the first channel and the second channel being transmittable concurrently in time, a reception condition detecting unit configured to detect a reception condition of one or more mobile stations residing within a local cell, and a scheduling unit configured to select one of the first channel and the second channel, a modulation scheme, and a transmission power to be used for at least a downlink to one of the mobile stations based on the detected reception condition.

A scheduling method used in a radio communication system for performing communication through three or more frequency bands based on orthogonal frequency division multiplexing includes transmitting a first channel through at least one of the three or more frequency bands and a second channel having smaller power than the first channel through at least another one of the three or more frequency bands, the first channel and the second channel being transmittable concurrently in time, detecting a reception condition of one or more mobile stations residing within a local cell, and selecting one of the first channel and the second channel, a modulation scheme, and a transmission power to be used for at least a downlink to one of the mobile stations based on the detected reception condition.

According to the radio mobile station as described above, a modulation and coding scheme suitable for each mobile station can be selected to improve throughput.

BRIEF DESCRIPTION OF THE DRAWINGS

Other objects and further features of the present invention will be apparent from the following detailed description when read in conjunction with the accompanying drawings, in which:

FIG. 6 is a drawing showing an example of a format of the MS profile list.

FIG. 9 is a drawing showing an example of a scheduling table;

DESCRIPTION OF THE PREFERRED EMBODIMENTS

In the following, embodiments of the present invention will be described with reference to the accompanying drawings. The disclosed embodiments are directed to an FFR method using a frequency reuse distance that is equal to 3. The frequency reuse distance may be any value that is 3 or more such as 4, 5, 6, and so on. Either CINR (Carrier to Interference and Noise Ratio) or CQI (Channel Quality Indicator) may be used as an indicator of reception condition. In the following embodiments, procedures will be described with reference to an example in which CINR is employed.

<Frequency Allocation>

Figure 1:
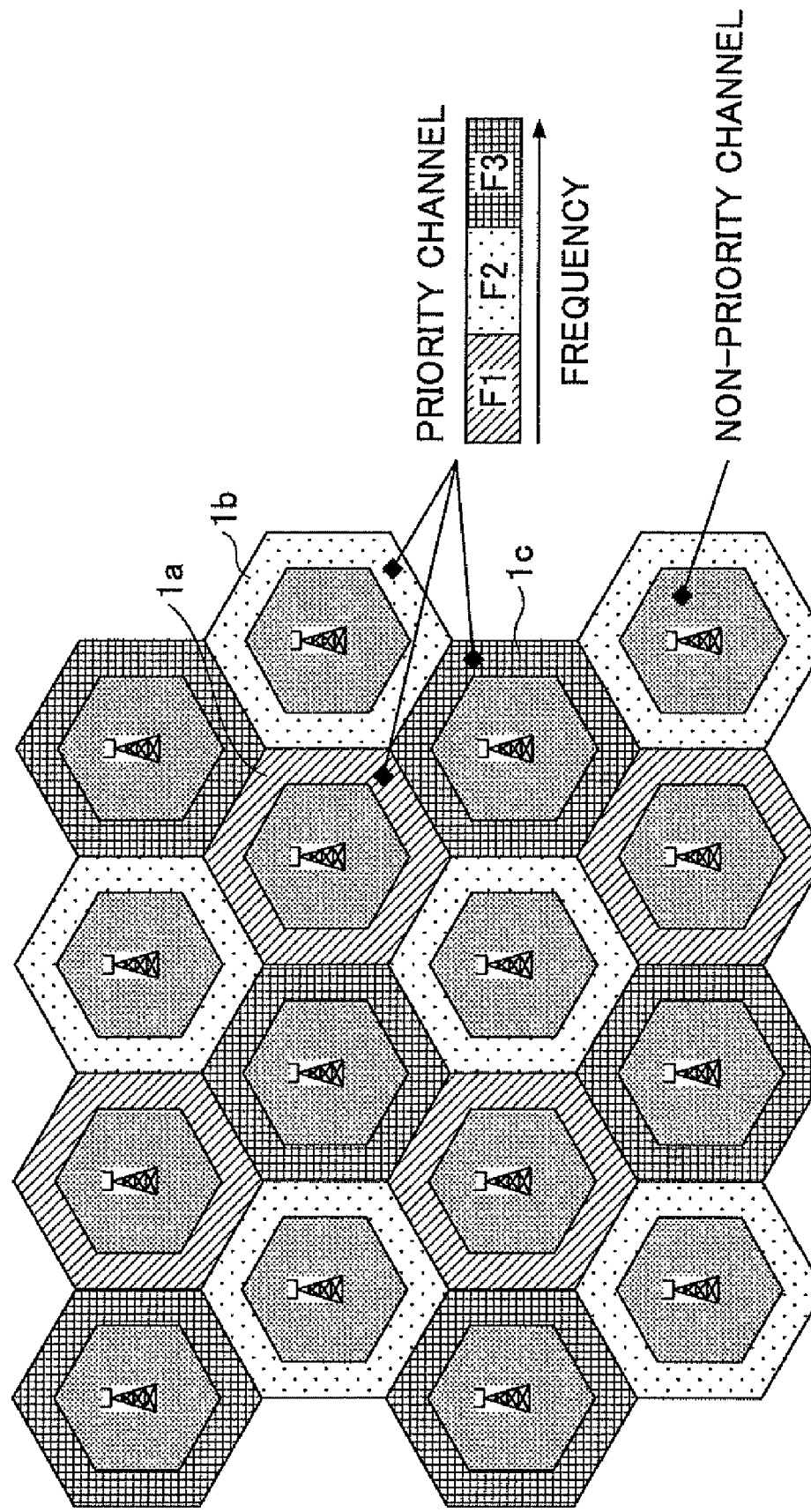
FIG. 1 is a drawing showing an example of frequency allocation when the frequency reuse distance is 3.

The frequency bands (F1+F2+F3) of OFDM is divided into three communication channels (F1, F2, F3) at the time of cell designing. As shown in FIG. 1, a priority channel serving as a first channel is allocated to each cell such that the allocated channel does not overlap the communication channels used by the adjacent cells. A cell 1a has a priority channel (F1) allocated thereto as shown by hatching, and also has non-priority channels (F2+F3) serving as second channels allocated thereto as shown in gray. A cell 1b has a priority channel (F2) allocated thereto as shown by a dotted area, and also has non-priority channels (F3+F1) allocated thereto as shown in gray. A cell 1c has a priority channel (F3) allocated thereto as shown as a mesh, and also has non-priority channels (F1+F2) allocated thereto as shown in gray.

Figure 2:
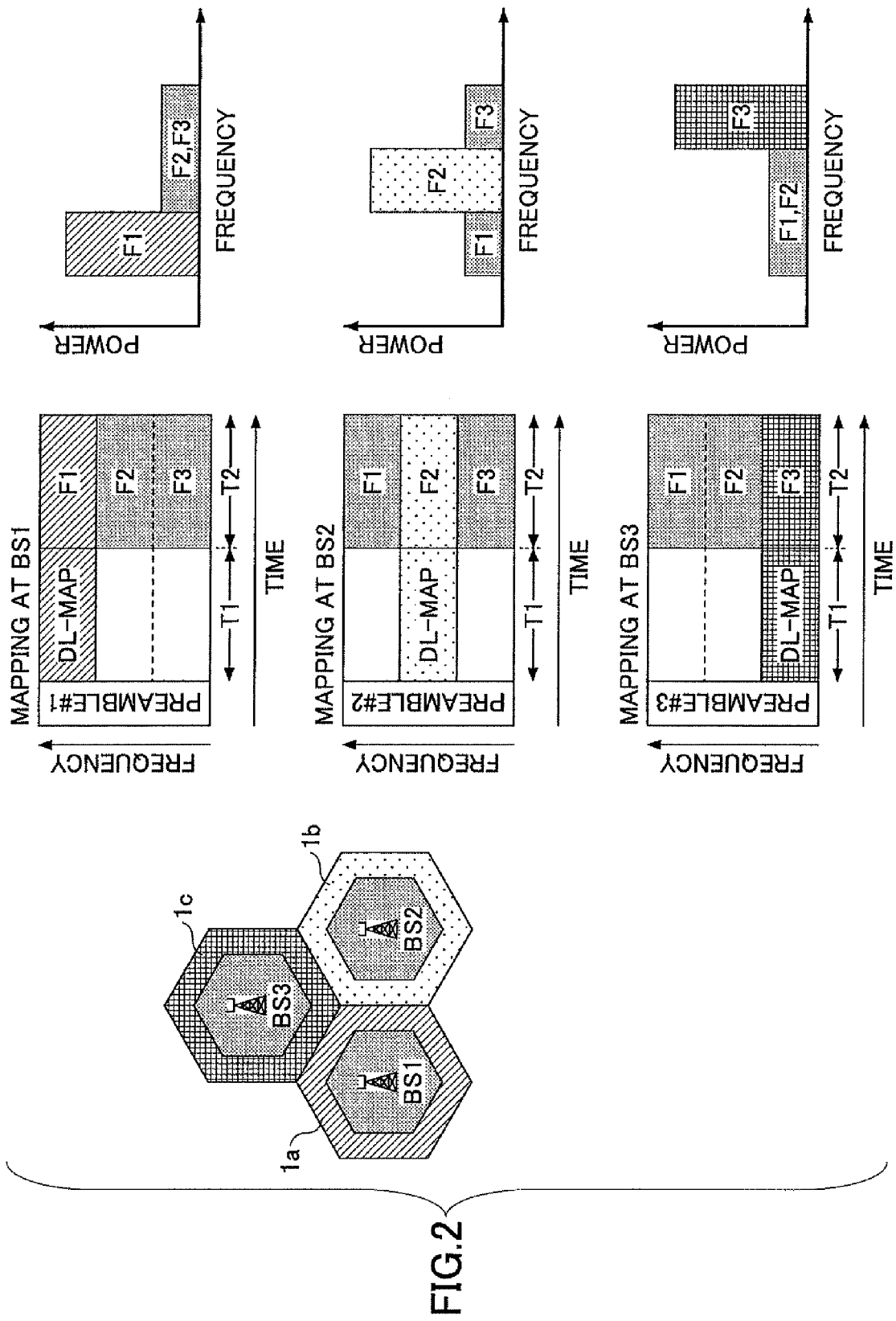
FIG. 2 is a drawing showing an example of a downlink subframe of an OFDMA radio frame when FFR is applied.

FIG. 2 is a drawing showing an example of a downlink subframe of an OFDMA (OFDM Access) radio frame when FFR is applied. Although control information areas such as FCH (Frame Control Header), DL-MAP, UL-MAP, and so on are provided in the case of IEEE802.16d/e, these control information areas are omitted in FIG. 2. In TDD (Time Division Duplexing), there are a subframe for downlink (i.e., link in a downward direction from a radio base station to a mobile station) and a subframe for uplink (i.e., link in an upward direction from a mobile station to a base station). For the sake of simplicity of illustration, however, only one subframe is shown in FIG. 2 as a representative example illustrating a common configuration. The horizontal axis represents a time dimension in units of symbols, and the vertical axis represents a frequency dimension in units of sub-channels.

As shown in FIG. 2, a radio base station BS1 of the cell 1a transmits with great power a DL-MAP and a downlink (DL) by use of a priority channel (F1) shown by hatching, and transmits with small power other downlinks by use of non-priority channels (F2+F3) shown in gray. A radio base station BS2 of the cell 1b transmits with great power a DL-MAP and a downlink (DL) by use of a priority channel (F2) shown as a dotted area, and transmits with small power other downlinks by use of non-priority channels (F3+F1) shown in gray. A radio base station BS3 of the cell 1c transmits with great power a DL-MAP and a downlink (DL) by use of a priority channel (F3) shown as a mesh, and transmits with small power other downlinks by use of non-priority channels (F1+F2) shown in gray. The frequency/power characteristics of BS1 through BS3 shown on the right-hand side of FIG. 2 illustrate the frequency/power characteristics of the portion corresponding to time T2 in the mappings for BS1 through BS3 shown at the center.

Figure 3:
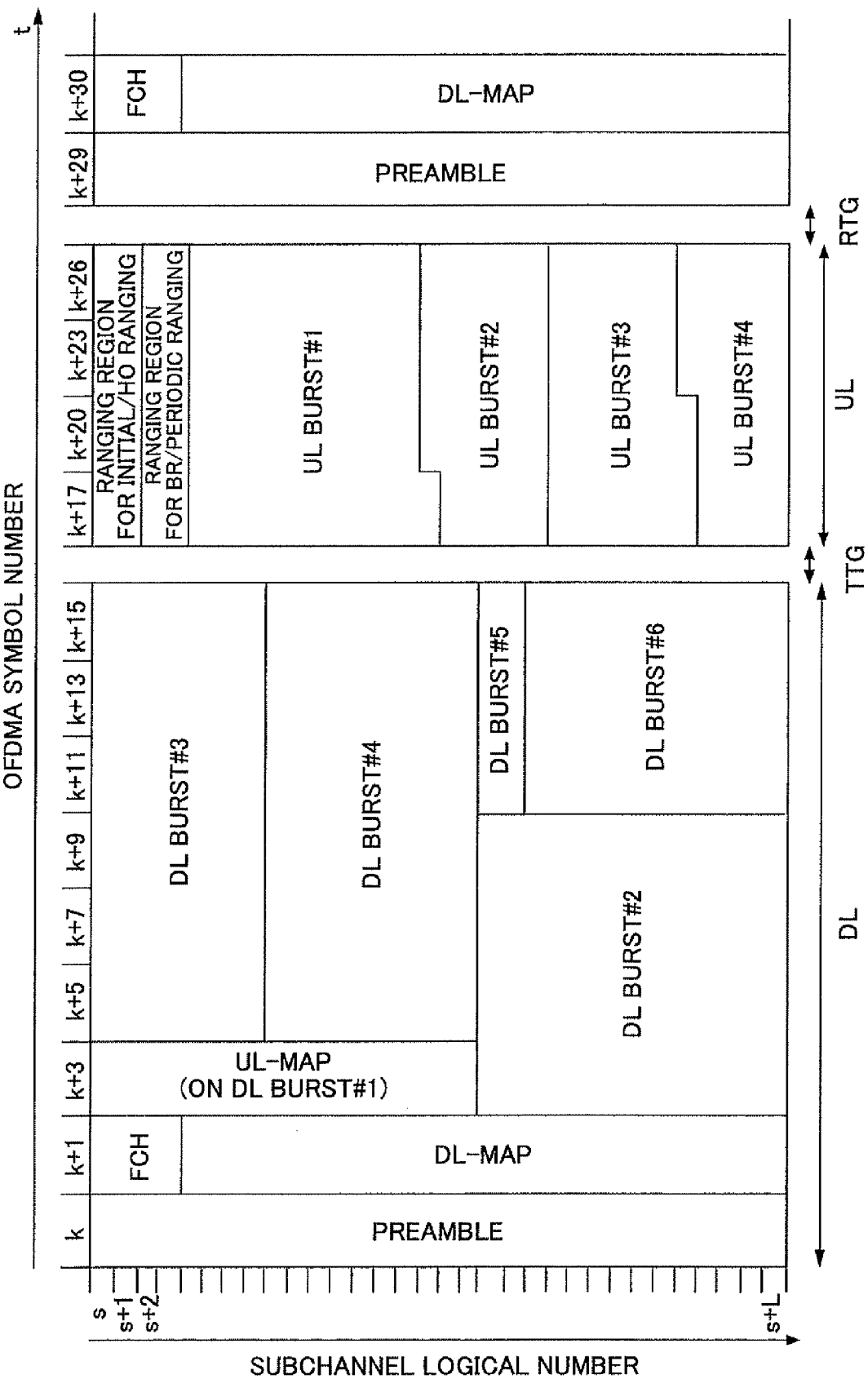
FIG. 3 is a drawing showing an example of the configuration of an OFDMA radio frame.

FIG. 3 is a drawing showing an example of the configuration of an OFDMA radio frame used in WiMAX (Worldwide Interoperability for Microwave Access). In FIG. 3, the horizontal axis represents the OFDMA symbol number, which corresponds to a time dimension. The vertical axis represents the subchannel logical number.

The OFDMA frame includes a downlink subframe, an uplink subframe, a TTG (Transmit/Receive Transition Gap), and a RTG (Receive/Transmit Transition Gap).

The DL subframe includes a preamble, an FCH (Frame Control Header), a DL-MAP, a UL-MAP, and a plurality of DL bursts. The preamble includes a preamble pattern required by a mobile station to establish frame synchronization. The FCH includes information about subchannels used and the DL-MAP that is provided at the immediately following position. The DL-MAP includes mapping information regarding the DL bursts in the DL subframe. By receiving and analyzing this information, a mobile station can identify a UL-MAP (transmitted on a DL burst #1) and DL bursts #2 through #6.

The UL-MAP includes mapping information regarding the ranging regions and UL bursts in the UL subframe. By reading this information, a mobile station can identify the ranging regions and UL bursts #1 through #4.

The term "burst" refers to the allocation and arrangement of slots in the downlink subframe and uplink subframe of a radio frame with respect to downlink user data and control messages transmitted to MS and uplink user data and control messages transmitted from MS. A burst is an area in which the same modulation-scheme and FEC (forward error correction) combination is used. DL-MAP/UL-MAP specifies a particular combination of a modulation scheme and an FEC for each burst. Results of scheduling performed by the radio base station are broadcast to all mobile stations by use of DL-MAP and UL-MAP attached at the beginning of a DL subframe in each frame.

DL-MAP (excluding FCH) having OFDMA symbol numbers k+1 and k+2 in FIG. 3 correspond to time T1 in the mapping shown in FIG. 2. Further, DL bursts having OFDMA symbol numbers k+3 through k+16 in FIG. 3 correspond to time T2 in the mapping shown in FIG. 2.

<Configuration of Radio Base Station>

Figure 4:
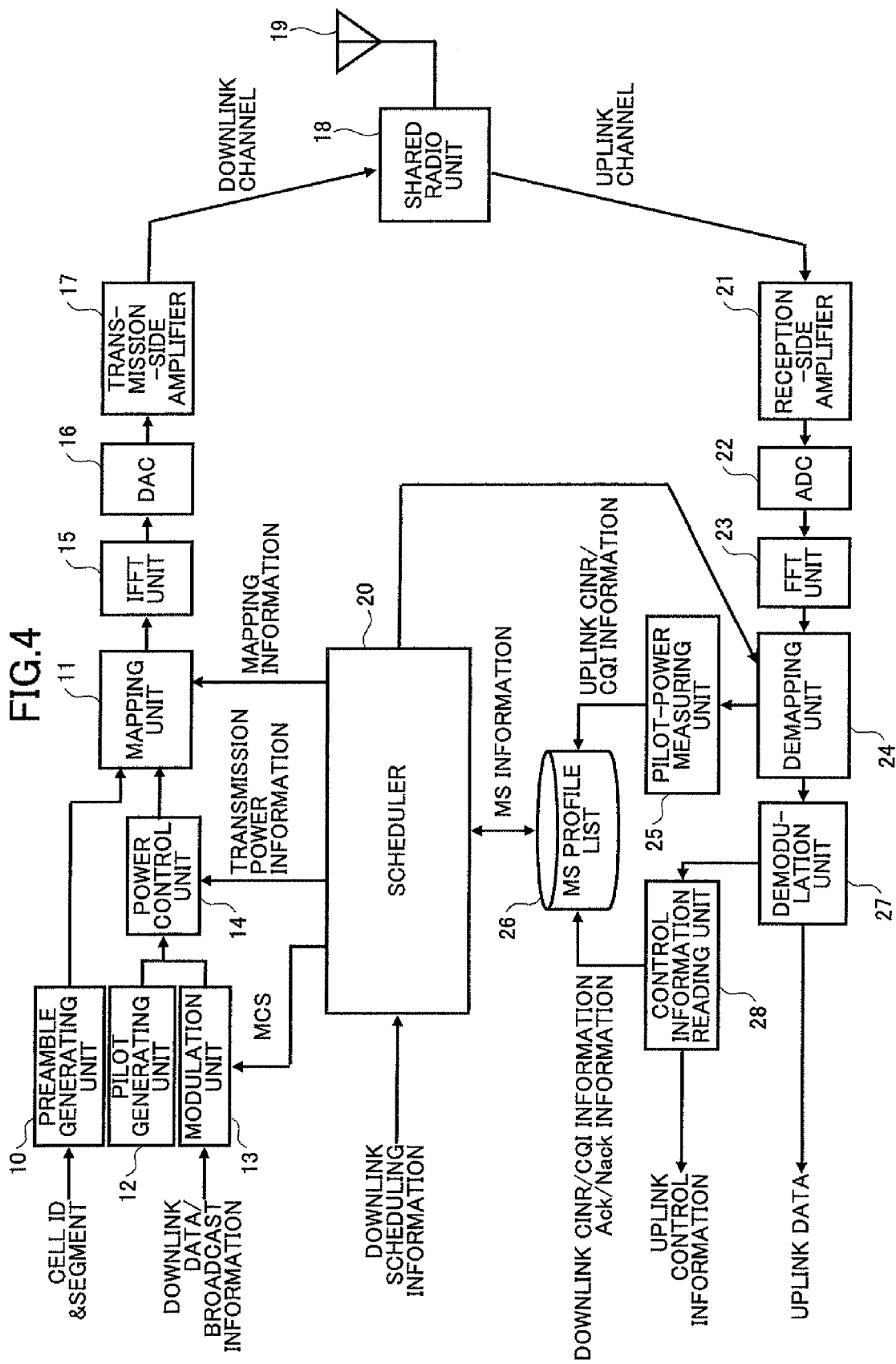
FIG. 4 is a block diagram showing an embodiment of a radio base station.

FIG. 4 is a block diagram showing an embodiment of a radio base station. In FIG. 4, a preamble generating unit 10 generates a preamble signal responsive to a local cell ID and segment number for provision to a mapping unit 11. The segment number is a number that identifies each of the cells 1a, 1b, and 1c shown in FIG. 1, for example.

A pilot generating unit 12 generates a pilot signal for provision to a power control unit 14. A modulation unit 13 performs modulation with respect to downlink data and broadcast information. The modulation and coding scheme (MCS) used for this modulation process is specified by a scheduler 20. The modulation unit 13 supplies a modulated signal obtained through modulation to the power control unit 14. The power control unit 14 amplifies the pilot signal and the modulated signal such that the transmission power becomes equal to a power specified by the scheduler 20, and supplies the amplified signals to the mapping unit 11.

The mapping unit 11 maps the preamble signal, the pilot signal, and the modulated signal according to mapping information specified by the scheduler 20. Output signals of the mapping unit 11 are IFFT transformed by an IFFT (Inverse FFT) unit 15 into time-domain signals, which are then subjected to digital-to-analog conversion by a DAC 16. A transmission-side amplifier 17 amplifies and changes the converted analog signals into high-frequency signals, which are then transmitted from an antenna 19 through a shared radio unit 18.

High frequency signals received from a mobile station (MS) by the antenna 19 are supplied through the shared radio unit 18 to a reception-side amplifier 21 for amplification and conversion into base-band signals. An ADC 22 performs analog-to-digital conversion with respect to the base-band signals. The converted signals are then FFT transformed by an FFT unit 23 into frequency-domain signals, which are then supplied to a demapping unit 24.

The demapping unit 24 extracts a preamble signal, a pilot signal, and a modulated signal inclusive of uplink data and control information from the frequency-domain signals. The demapping unit 24 supplies the pilot signal to a pilot-power measuring unit 25, and supplies the modulated signal inclusive of uplink data and control information to a demodulation unit 27. Demapping information is specified by the scheduler 20.

The pilot-power measuring unit 25 measures an electric power of the pilot signal to obtain CINR (or CQI) data regarding the uplink, and adds the data to an MS profile list stored in a memory unit 26 on a mobile-station-specific basis. CINR for uplink may be $CINR_{Pilot}$.

The demodulation unit 27 demodulates the modulated signal inclusive of uplink data and control information. The demodulation unit 27 supplies the demodulated uplink data to a subsequent circuit (not illustrated), and also supplies the demodulated control information to a control information reading unit 28.

The control information reading unit 28 supplies the demodulated control information to a subsequent circuit (not illustrated). The control information reading unit 28 also extracts CINR (or CQI) data regarding the downlink contained in the control information, and adds the extracted data to the MS profile list stored in the memory unit 26 on a mobile-station-specific basis. CINR for downlink may be $CINR_{1R}$, $CINR_{3R}$, and $CINR_{Pilot}$.

The scheduler 20 receives, from an upper-level circuit, downlink scheduling information such as an ID of each mobile station having radio connection with the local radio base station. The scheduler 20 determines a communication channel, a modulation and coding scheme (MCS), and a transmission power for use by each mobile station by referring to the MS profile list and a scheduling table stored in the memory unit 26, thereby controlling the modulation unit 13, the power control unit 14, the mapping unit 11, and the demapping unit 24 accordingly.

<Configuration of Mobile Station>

Figure 5:
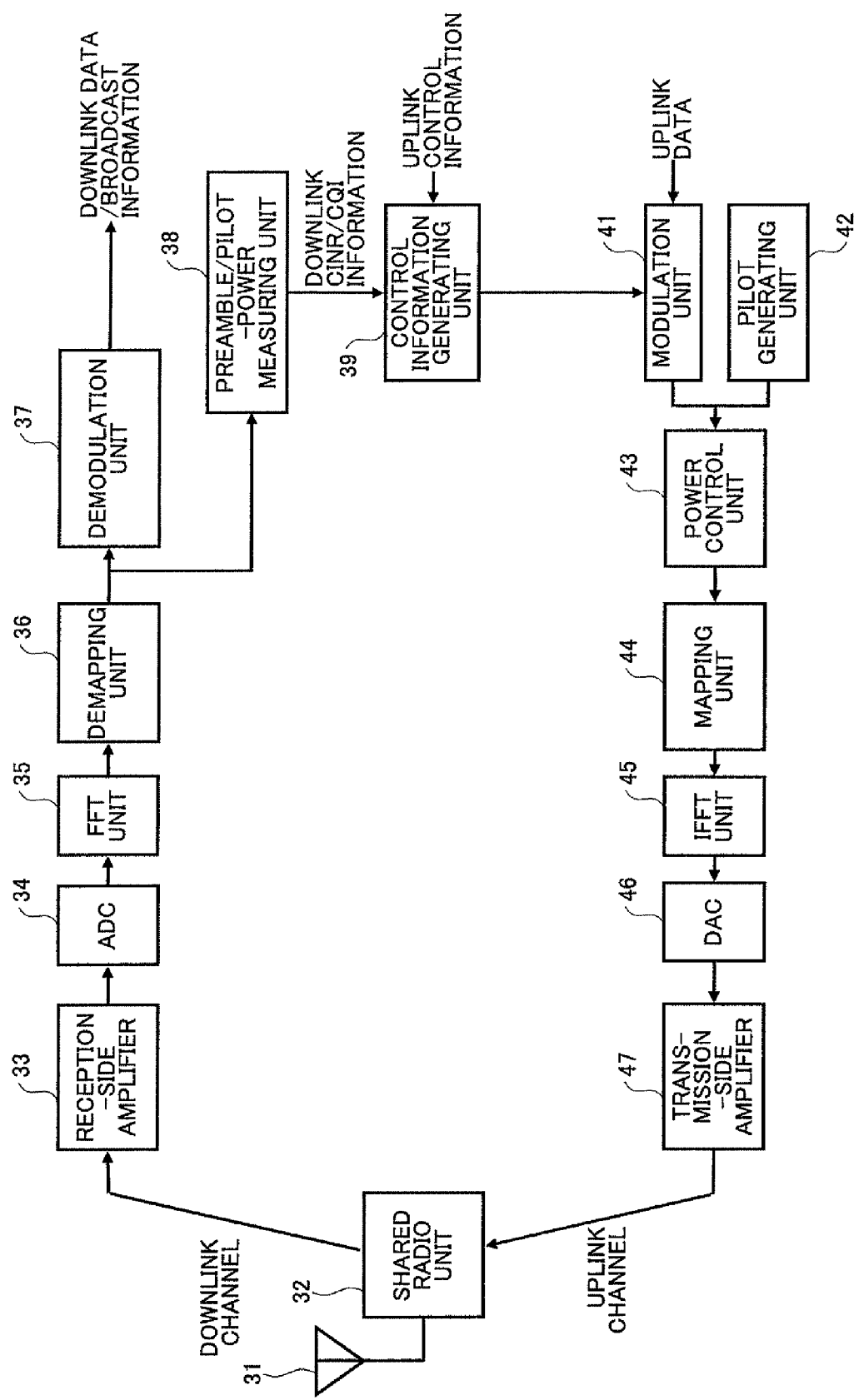
FIG. 5 is a block diagram showing an embodiment of a mobile station.

FIG. 5 is a block diagram showing an embodiment of a mobile station. In FIG. 5, high frequency signals received from a radio base station by an antenna 31 are supplied through a shared radio unit 32 to a reception-side amplifier 33 for amplification and conversion into base-band signals. An ADC 34 performs analog-to-digital conversion with respect to the base-band signals. The converted signals are then FFT transformed by an FFT unit 35 into frequency-domain signals, which are then supplied to a demapping unit 36.

The demapping unit 36 extracts a preamble signal, a pilot signal, and a modulated signal inclusive of downlink data and broadcast information from the frequency-domain signals. The demapping unit 36 supplies the preamble signal and the pilot signal to a preamble/pilot-power measuring unit 38, and supplies the modulated signal inclusive of downlink data and broadcast information to a demodulation unit 37. Demapping information is specified by a control unit (not shown) based on the received DL-MAP.

The demodulation unit 37 demodulates the modulated signal inclusive of downlink data and broadcast information, and supplies the demodulated downlink data and broadcast information to a subsequent circuit (not illustrated).

The preamble/pilot-power measuring unit 38 measures the electric powers of the preamble signal and pilot signal to obtain CINR (or CQI) data regarding the downlink for provision to a control information generating unit 39. The control information generating unit 39 generates control information based on CINR (or CQI) data regarding the downlink and information such as Ack/NAck specified by an upper-level circuit. The generated control information is supplied to a modulation unit 41.

A pilot generating unit 42 generates a pilot signal for provision to a power control unit 43.

The modulation unit 41 performs modulation with respect to uplink data and the control information. The modulation and coding scheme (MCS) used for the modulation is specified by a control unit (not shown) based on the received UL-MAP. The modulation unit 41 supplies a modulated signal obtained through modulation to the power control unit 43.

The power control unit 43 amplifies the pilot signal and the modulated signal such that the transmission power becomes equal to a specified power, and supplies the amplified signals to a mapping unit 44. The mapping unit 44 maps the preamble signal, the pilot signal, and the modulated signal according to specified mapping information. A transmission power and demapping information are specified by a control unit (not shown) based on the received UL-MAP.

Output signals of the mapping unit 44 are IFFT-transformed by an IFFT unit 45 into time-domain signals, which are then subjected to digital-to-analog conversion by a DAC 46. A transmission-side amplifier 47 amplifies and changes the converted analog signals into high-frequency signals, which are then transmitted from the antenna 31 through the shared radio unit 32.

<Frequency Allocation and Preparation for Interference Prevention>

The transmission power of a priority channel is set to a fixed value. The transmission power of a non-priority channel is determined as follows. In order to compensate for interference between a priority channel (or non-priority channel) of a local cell and a non-priority channel (or priority channel) of another cell, a tolerable interference power value $P_{limit}$ [dBm] of the interference with a non-priority channel is set to a fixed value, and a transmission power threshold Tr [dBm] of the non-priority channel is determined such that the interference electric power at the edge of each cell does not exceed the tolerable interference power value. In the following, BW is a bandwidth of the non-priority channel, c being an attenuation constant, d being a radius of the area covered by the cell, and α being an attenuation index.

$$Tr = P_{limit}/[\Gamma(r_{edge})BW]$$

$$\Gamma(d) = c/d^\alpha \quad (1)$$

<Selection of Communication Channel and Initial Scheduling at Radio Base Station>

A radio base station obtains, on a mobile-station-specific basis, the CINR value ($CINR_{3R}$) of a priority channel (reuse frequency=3) and the CINR value ($CINR_{1R}$) of a non-priority channel (reuse frequency=1) derived from a preamble signal by each mobile station. The radio base station also obtains, on a mobile-station-specific basis, the CINR values ($CINR_{Pilot}$) of the downlink and uplink derived from pilot signals. The radio base station stores these obtained values in the MS profile list stored in the memory unit 26. Further, the radio base station stores an average of the numbers of Ack and NAck returned from each mobile station in the MS profile list.

FIG. 6 is a drawing showing an example of a format of the MS profile list. The MS profile list includes the CINR value ($CINR_{1R}$) of the downlink, the CINR value ($CINR_{3R}$) of the downlink, the CINR value ($CINR_{Pilot}$) of the downlink, the CINR value ($CINR_{Pilot}$) of the uplink, an indication of either a priority channel or a non-priority channel (i.e., an indication of an FFR zone), an indication of either Ack or NAck returned from a mobile station, MCS, and an NAck rate, separately for each mobile station (MS#1 through MS#n).

Figure 7:
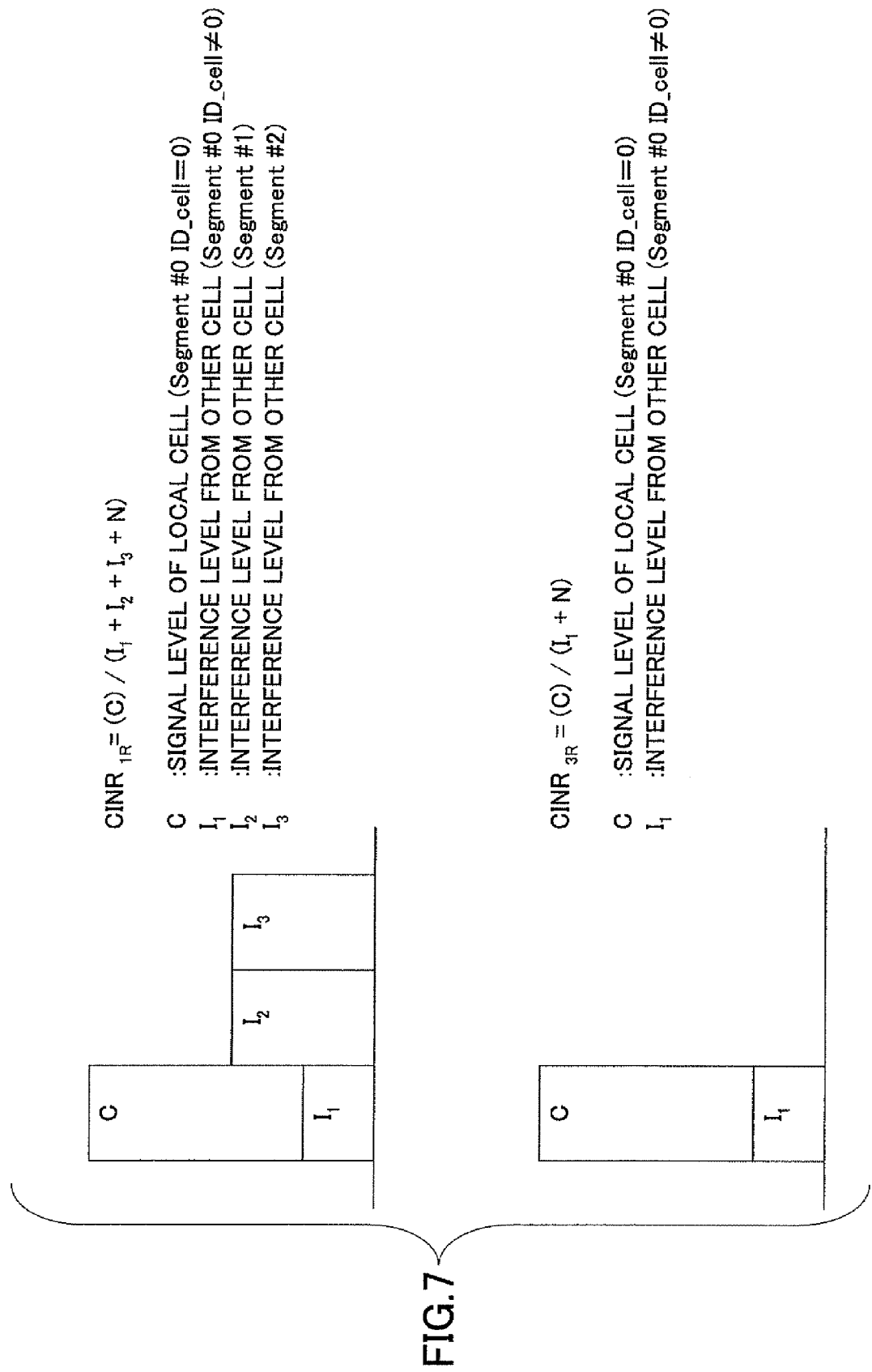
FIG. 7 is a drawing for explaining $CINR_{1R}$ and $CINR_{3R}$.

The difference between $CINR_{1R}$ and $CINR_{3R}$ derived from a preamble signal relates to whether interference with other cells is involved. As shown in FIG. 7, these values are obtained as a ratio of the desired signal power of the local cell to the interference power from other cell(s). Namely, $CINR_{1R}$ is derived by use of formula (2), and $CINR_{3R}$ is derived by use of formula (3) as follows.

$$CINR_{1R} = C/(I_1 + I_2 + I_3 + N) \quad (2)$$

$$CINR_{3R} = C/(I_1 + N) \quad (3)$$

C: Signal Level of Local Cell (Segment #0 ID_Cell=0)
$I_1$: Level of Interference with Closest Cell (Segment #0 ID_Cell≠0)
$I_2$: Level of Interference with Adjacent Cell (Segment #1)
$I_3$: Level of Interference with Adjacent Cell (Segment #2)
N: Noise Level <Selection of Communication Channel and Initial Scheduling for Downlink at Radio Base Station>

Figure 8:
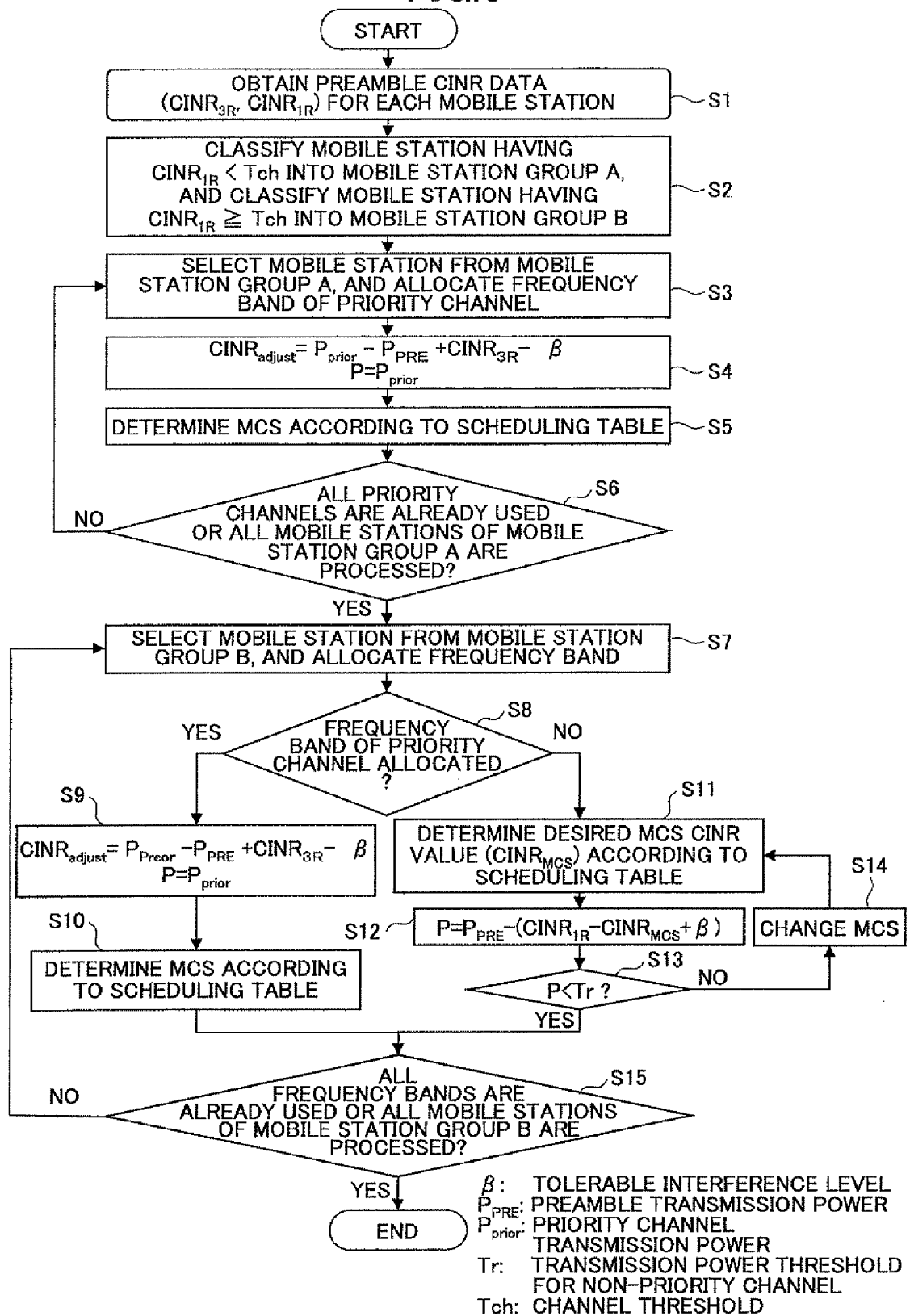
FIG. 8 is a flowchart of selection of communication channel and initial scheduling for downlink performed at a radio base station.

FIG. 8 is a flowchart of selection of communication channel and initial scheduling for downlink performed at a radio base station. In step S1, the scheduler 20 obtains CINR data ($CINR_{3R}$, $CINR_{1R}$) of the preamble of the downlink for each mobile station from the MS profile list.

In step S2, mobile stations are grouped into a mobile station group A consisting of mobile stations having CINR values ($CINR_{1R}$) smaller than a channel threshold Tch and a mobile station group B consisting of mobile stations having CINR values ($CINR_{1R}$) equal to or larger than the channel threshold Tch. Data of the groups (mobile station group A or B) are then stored in the FFR zone field of the MS profile list. The purpose of this grouping is to assign mobile stations having poor reception conditions to a priority channel having little interference with adjacent cells because such mobile stations are likely to suffer interference with other cells. Further, mobile stations having satisfactory reception conditions are assigned to a non-priority channel because such mobile stations are not likely to suffer interference with other cells, and, also, the transmission power of these mobile stations is set to a level that does not interfere with adjacent cells.

The channel threshold Tch [dB] is determined as follows, such that mobile stations having sufficiently high robustness (i.e., robustness against disturbance) can be selected despite the fact that the transmission power is set lower than the transmission power threshold Tr [dBm].

$$Tch > CINR(MCS_{min}) - (Tr - P_{PRE})$$

CINR ($MCS_{min}$): CINR [dB] required for MCS having the lowest encoding ratio
$P_{PRE}$: Transmission Power Value [dBm] for Preamble Signal In step S3, one mobile station belonging to the mobile station group A is selected from the MS profile list, and is assigned to the frequency band of the priority channel. In step S4, $CINR_{3R}$ of the priority channel is corrected as shown in formula (4) by taking into account an interference power correction value β serving as a margin in order to take into account interference with the non-priority channels of adjacent cells. Further, transmission power P is set to $P_{Prior}$.

$$CINR_{adjust} = P_{Prior} - P_{PRE} + CINR_{3R} - \beta [dB] \quad (4)$$

$$P = P_{Prior}$$

Here, $P_{PRE}$ is a transmission power (fixed value) of the preamble, and $P_{Prior}$ is a transmission power of the priority channel (which is set to a fixed value such that all mobile stations residing in the local cell can receive signals). CINR3R is corrected for an error between the transmission power of the preamble and the transmission power of the priority channel.

In step S5, a row corresponding to required CINR corresponding to $CINR_{adjust}$ is selected from the scheduling table shown in FIG. 9. MCS corresponding to the selected row corresponding to the required CINR is chosen as MCS to be used for the downlink with respect to the mobile station of interest. When $CINR_3$ is selected from the scheduling table, for example, MCS to be used is QPSK, CTC (Convolutional Turbo Coding), R (encoding ratio)=1/2, Repetition (i.e. number of repetitions)=1.

As shown in FIG. 9, the scheduling table includes CINR required for each MCS, i.e., CINR0 through CINR5 which are arranged in an ascending order of satisfactory reception conditions. With respect to each CINR, a corresponding modulation and coding scheme is registered in advance by specifying either 16 QAM or QPSK, CTC, R, and Repetition.

According to step S6, steps S5 through S5 are repeated until a frequency band is allocated to all the mobile stations in the mobile station set A or until all the priority channels are allocated.

In step S7, one of the mobile stations belonging to the mobile station group B is selected, and is assigned either to the frequency band of a priority channel that has not yet been allocated in step S3 or to the frequency band of a non-priority channel. Here, the frequency band of a remaining priority channel is preferentially allocated.

In step S8, a check is made as to whether the frequency band to be allocated is that of a priority channel. If the frequency band to be allocated is that of a priority channel, $CINR_{3R}$ of the priority channel is corrected in step S9 by use of formula (8) for the interference power correction value β in order to take into account interference with the non-priority channels of adjacent cells. Further, transmission power P is set to $P_{Prior}$.

$$CINR_{adjust} = P_{Prior} - P_{PRE} + CINR_{3R} - \beta [dB] \quad (4)$$

$$P = P_{Prior}$$

In step S10, a row corresponding to required CINR corresponding to $CINR_{adjust}$ is selected from the scheduling table shown in FIG. 9. MCS corresponding to the selected row corresponding to the required CINR is chosen as MCS to be used for the downlink with respect to the mobile station of interest.

If the check in step S8 finds that a non-priority channel is to be allocated, the procedure proceeds to step S11. In step S11, MCS having a sufficiently low encoding ratio such as MCS (QPSK, CTC, R=1/2, Repetition=1) corresponding $CINR_3$ shown in the scheduling table of FIG. 9 is selected as an initial setting.

CINR required for MCS selected in step S11 is referred to as $CINR_{MCS}$. $CINR_{MCS}$ is corrected for the interference power correction value β, and a difference ΔP from the CINR value ($CINR_{1R}$) of a non-priority channel is calculated. Then, transmission power $P_{PRE}$ is weakened by an amount equal to the difference ΔP to derive optimum transmission power P (see formula (5)).

$$P = P_{PRE} - (CINR_{1R} - CINR_{MCS} + \beta)[dB] \quad (5)$$

For a non-priority channel, the transmission power needs to be set lower than the transmission power threshold Tr. If the check in step S13 finds that transmission power P is equal to or larger than the transmission power threshold Tr, MCS having a lower encoding ratio is selected in step S14, followed by performing step S11 and step S12 to recalculate transmission power P.

Steps S7 through S14 are repeated until a check in step S15 finds that all the frequency bands are allocated, or finds that frequency band allocation is performed for all the mobile stations belonging to the mobile station group B. The scheduling then comes to an end. When step S9 and S10 are performed, the FFR zone field of the MS profile list is changed from "B" to "A" for the mobile stations that initially belonged to the mobile station group B but are assigned to priority channels.

After the scheduling for downlink is completed according to the above-described procedure, the modulation unit 13 performs various modulation processes on transmission data according to MCS obtained by the scheduler 20. The power control unit 14 sets the transmission power of the downlink data and pilot signal for non-priority channels equal to the transmission power obtained by the scheduler 20. The mapping unit 11 allocates frequency bands.

<Scheduling for Downlink after Selection of Communication Channel at Radio Base Station>

Figure 10:
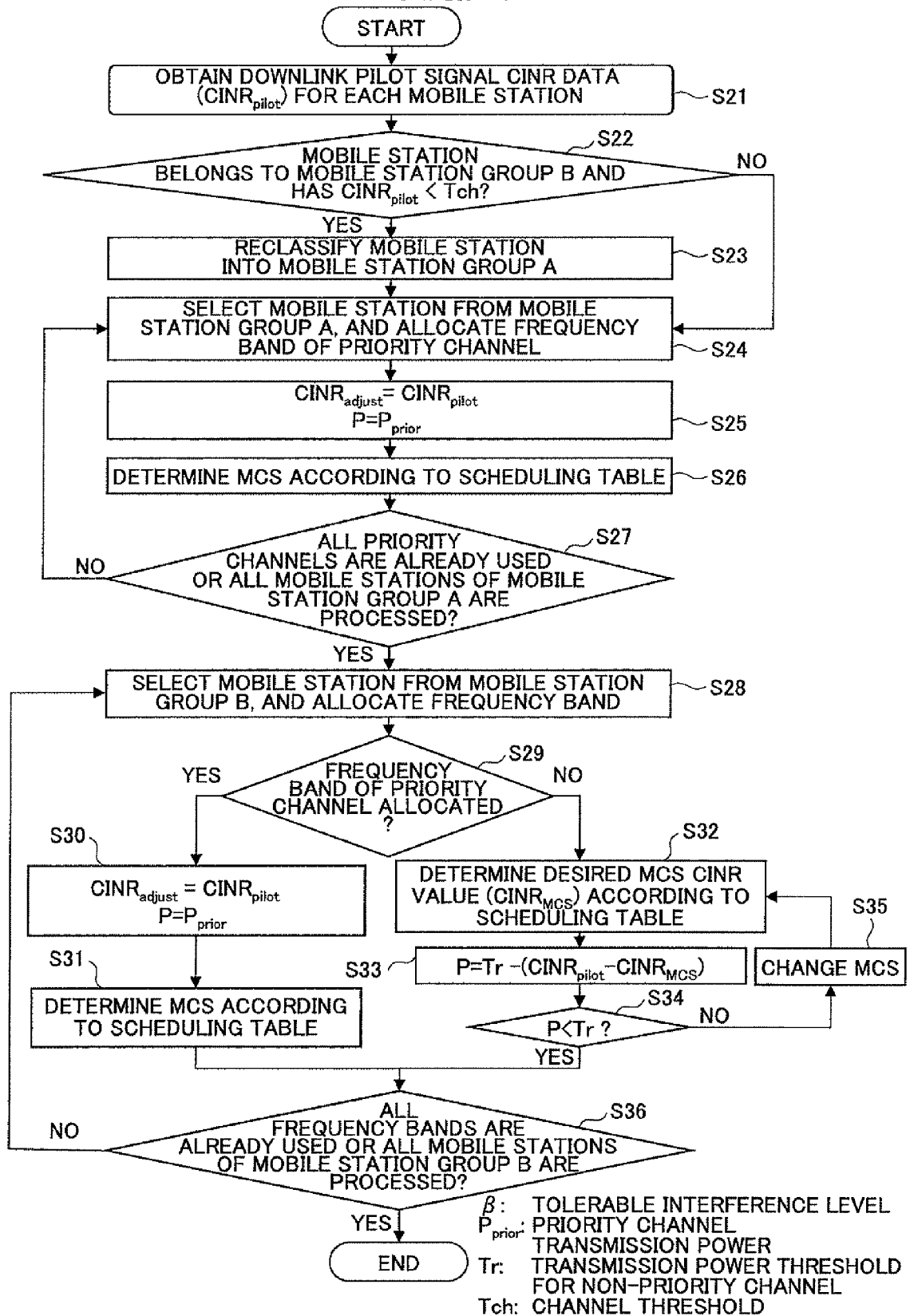
FIG. 10 is a flowchart of scheduling for downlink after selection of communication channels performed at a radio base station.

FIG. 10 is a flowchart of scheduling for downlink after selection of communication channels performed at a radio base station. In step S21, the scheduler 20 obtains CINR data ($CINR_{Pilot}$) of the pilot signal of the downlink for each mobile station from the MS profile list.

The transmission condition of a mobile station using a non-priority channel may deteriorate, such that a transmission power lower than the transmission power threshold is not sufficient for proper transmission. In consideration of this, Step S22 detects a mobile station belonging to the mobile station group B for which $CINR_{Pilot}$ is lower than the channel threshold Tch. In step S23, this mobile station is moved to the mobile station group A. When a communication channel being used is changed, the CINR value of the preamble is used instead of the CINR value of the pilot signal.

In step S24, one mobile station belonging to the mobile station group A is selected from the MS profile list, and is assigned to the frequency band of the priority channel. In step S25, CINR and transmission power P are selected.

$$CINR_{adjust} = CINR_{Pilot}$$

$$P = P_{Prior}$$

In step S26, a row corresponding to required CINR corresponding to $CINR_{adjust}$ is selected from the scheduling table shown in FIG. 9. MCS corresponding to the selected row corresponding to the required CINR is chosen as MCS to be used for the downlink with respect to the mobile station of interest.

According to step S27, steps S24 through S26 are repeated until a frequency band is allocated to all the mobile stations in the mobile station set A or until all the priority channels are allocated.

In step S28, one of the mobile stations belonging to the mobile station group B is selected, and is assigned either to the frequency band of a priority channel that has not yet been allocated in step S24 or to the frequency band of a non-priority channel.

In step S29, a check is made as to whether the frequency band to be allocated is that of a priority channel. If the frequency band to be allocated is that of a priority channel, CINR and transmission power P are selected in step S30.

$$CINR_{adjust} = CINR_{Pilot}$$

$$P = P_{Prior}$$

In step S31, a row corresponding to required CINR corresponding to $CINR_{adjust}$ is selected from the scheduling table shown in FIG. 9. MCS corresponding to the selected row corresponding to the required CINR is chosen as MCS to be used for the downlink with respect to the mobile station of interest.

If the check in step S29 finds that a non-priority channel is to be allocated, the procedure proceeds to step S32. In step S32, MCS having a sufficiently low encoding ratio such as MCS (QPSK, CTC, R=1/2, Repetition=1) corresponding $CINR_3$ shown in the scheduling table of FIG. 9 is selected as an initial setting.

CINR required for MCS selected in step S32 is referred to as $CINR_{MCS}$. A difference ΔP between $CINR_{MCS}$ and the CINR value ($CINR_{Pilot}$) of the pilot signal is calculated. Then, transmission power threshold Tr is weakened by an amount equal to the difference ΔP to derive optimum transmission power P (see formula (6)).

$$P = Tr - (CINR_{Pilot} - CINR_{MCS})[dB] \quad (6)$$

For a non-priority channel, the transmission power needs to be set lower than the transmission power threshold Tr. If the check in step S34 finds that transmission power P is equal to or larger than the transmission power threshold Tr, MCS having a lower encoding ratio is selected in step S35, followed by performing step S32 and step S33 to recalculate transmission power P.

Steps S28 through S35 are repeated until a check in step S36 finds that all the frequency bands are allocated, or finds that frequency band allocation is performed for all the mobile stations belonging to the mobile station group B. The scheduling for downlink then comes to an end.

<Scheduling for Uplink at Radio Base Station>

Figure 11:
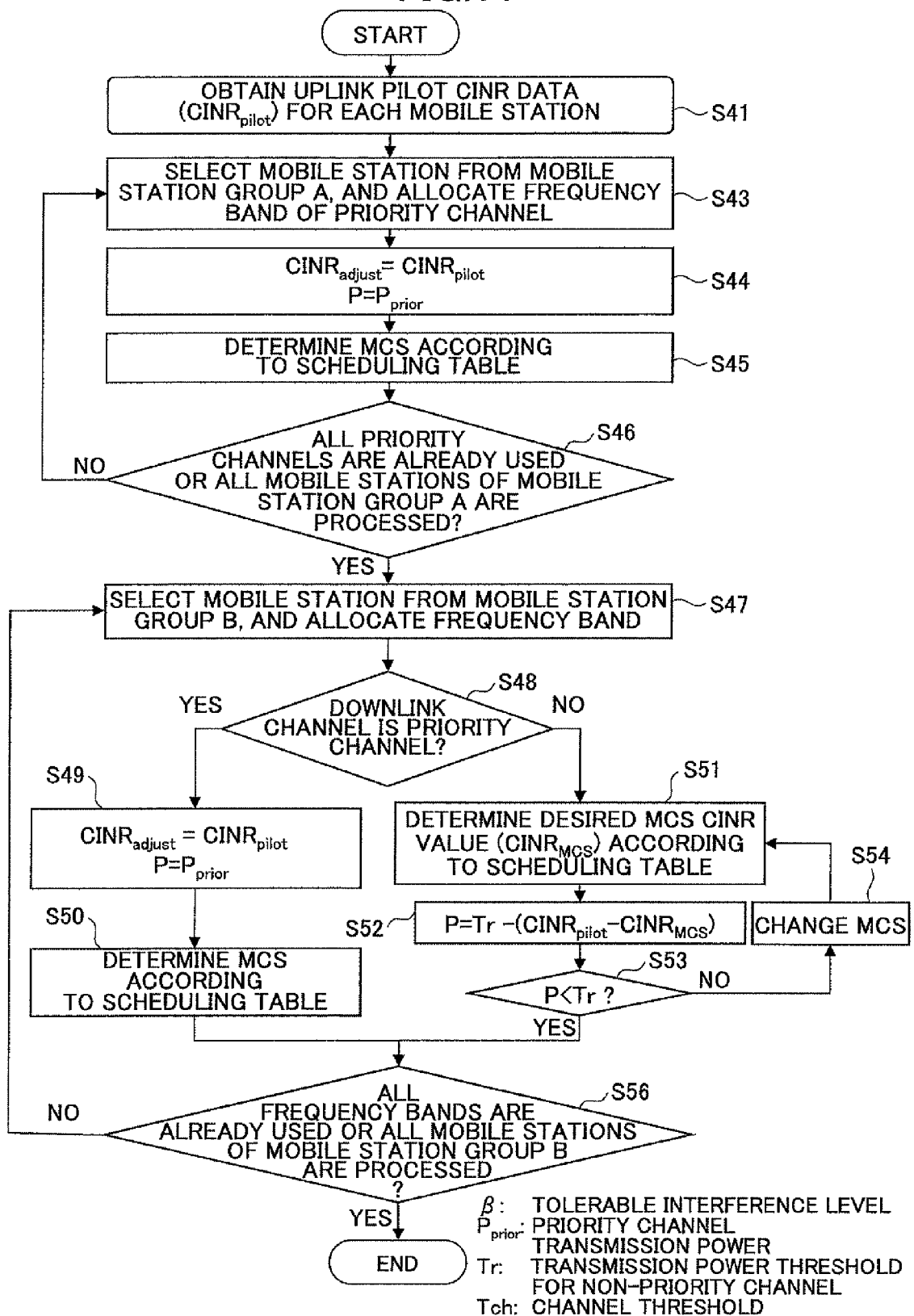
FIG. 11 is a flowchart of scheduling for uplink performed at a radio base station.

FIG. 11 is a flowchart of scheduling for uplink performed at a radio base station. In step S41, the scheduler 20 obtains CINR data ($CINR_{Pilot}$) of the pilot signal of the uplink for each mobile station from the MS profile list.

In step S43, one mobile station belonging to the mobile station group A is selected from the MS profile list, and is assigned to the frequency band of the priority channel. In step S44, CINR and transmission power P are selected.

$$CINR_{adjust} = CINR_{Pilot}$$

$$P = P_{Prior}$$

In step S45, a row corresponding to required CINR corresponding to $CINR_{adjust}$ is selected from the scheduling table shown in FIG. 9. MCS corresponding to the selected row corresponding to the required CINR is chosen as MCS to be used for the downlink with respect to the mobile station of interest.

According to step S46, steps S43 through S45 are repeated until a frequency band is allocated to all the mobile stations in the mobile station set A or until all the priority channels are allocated.

In step S47, one of the mobile stations belonging to the mobile station group B is selected, and is assigned either to the frequency band of a priority channel that has not yet been allocated in step S43 or to the frequency band of a non-priority channel.

In step S48, a check is made as to whether the frequency band to be allocated is that of a priority channel. If the frequency band to be allocated is that of a priority channel, CINR and transmission power P are selected in step S49.

$$CINR_{adjust} = CINR_{Pilot}$$

$$P = P_{Prior}$$

In step S50, a row corresponding to required CINR corresponding to $CINR_{adjust}$ is selected from the scheduling table shown in FIG. 9. MCS corresponding to the selected row corresponding to the required CINR is chosen as MCS to be used for the uplink with respect to the mobile station of interest.

If the check in step S48 finds that a non-priority channel is to be allocated, the procedure proceeds to step S51. In step S51, MCS having a sufficiently low encoding ratio such as MCS (QPSK, CTC, R=1/2, Repetition=1) corresponding $CINR_3$ shown in the scheduling table of FIG. 9 is selected as an initial setting.

CINR required for MCS selected in step S51 is referred to as $CINR_{MCS}$. A difference $\Delta P$ between $CINR_{MCS}$ and the CINR value ($CINR_{Pilot}$) of the pilot signal is calculated. Then, transmission power threshold Tr is weakened by an amount equal to the difference $\Delta P$ to derive optimum transmission power P (see formula (6)).

$$P = Tr - (CINR_{Pilot} - CINR_{MCS})[dB] \quad (6)$$

For a non-priority channel, the transmission power needs to be set lower than the transmission power threshold Tr. If the check in step S53 finds that transmission power P is equal to or larger than the transmission power threshold Tr, MCS having a lower encoding ratio is selected in step S54, followed by performing step S51 and step S52 to recalculate transmission power P.

Steps S47 through S54 are repeated until a check in step S55 finds that all the frequency bands are allocated, or finds that frequency band allocation is performed for all the mobile stations belonging to the mobile station group B. The scheduling then comes to an end.

After the scheduling for uplink and downlink is completed according to the procedures shown in FIG. 8, FIG. 10, and FIG. 11, the modulation unit 13 performs various modulation processes on transmission data according to the downlink MCS selected by the scheduler 20. The power control unit 14 sets the transmission power of the downlink data and pilot signal for non-priority channels equal to the downlink transmission power obtained by the scheduler 20. The mapping unit 11 allocates frequency bands. The schedule information regarding uplink is required by the modulation unit 41 and the power control unit 43 at the mobile station side. BS (base station) thus includes the uplink schedule information in UL-MAP as control information for transmission to each mobile station.

Figure 12:
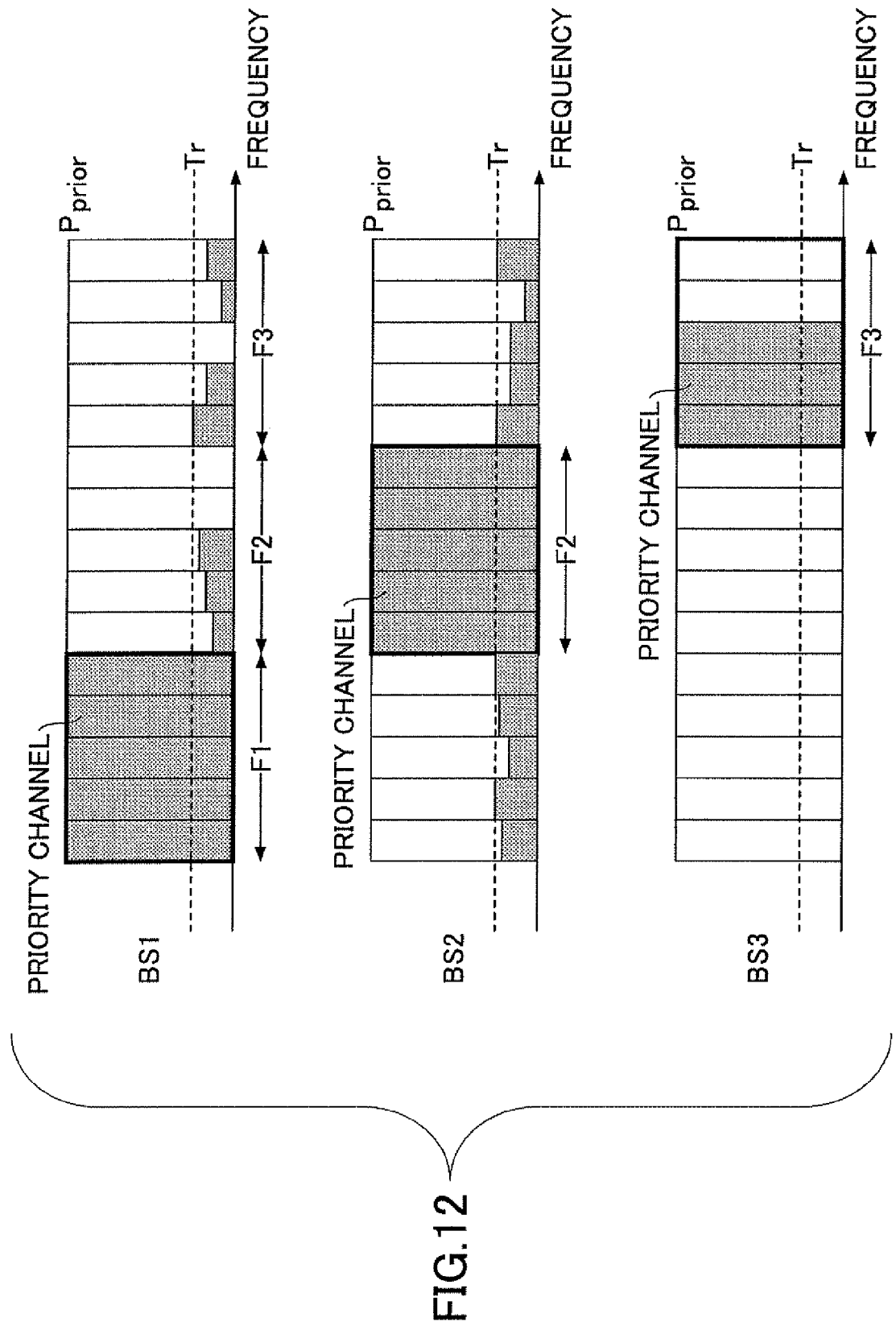
FIG. 12 is a drawing showing the frequency/power characteristics of downlinks of BS1 through BS3.

FIG. 12 is a drawing showing the frequency/power characteristics of downlinks of BS1 through BS3 scheduled according to FIG. 8 or FIG. 10. As shown in FIG. 12, the priority channels have a fixed power while the non-priority channels have powers that are lower than the transmission power threshold Tr.

<Correction of Interference Power Correction Value β and Transmission Power Threshold Tr>

Figure 13:
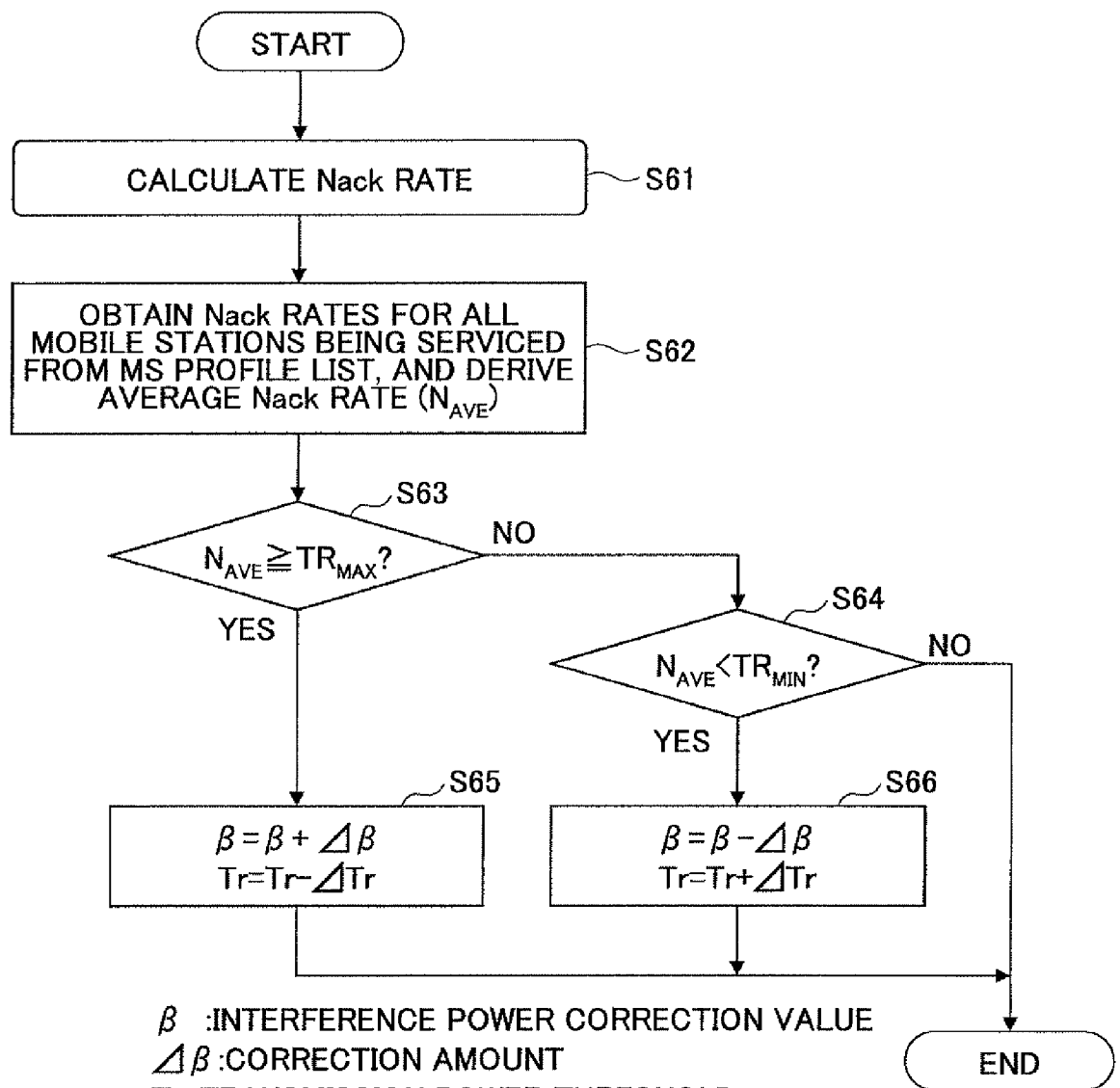
FIG. 13 is a flowchart showing a procedure of correcting an interference power correction value.

The scheduler 20 makes correction to the interference power correction value at constant intervals as shown in FIG. 13. In step S61, the scheduler 20 reads the numbers of Ack and Nack from the MS profile list stored in the memory unit 26 on a mobile-station-specific basis, and obtains a PER (Packet Error Rate) as a Nack rate for recording in the MS profile list. In step S62, an average $N_{AVE}$ of the Nack rates for mobile stations (MS1 through MSn) is obtained.

In steps S63 and S64, average $N_{AVE}$ is compared with communication quality thresholds TRMAX and TRMIN. Communication quality thresholds TRMAX and TRMIN are fixed values selected in advance such that TRMAX>TRMIN.

If $N_{AVE}$ is larger than or equal to TRMAX, i.e., if average $N_{AVE}$ has deteriorated due to a large number of Nack occurrences, the interference power correction value β is increased by a correction amount equal to $\Delta\beta$ (which is a small fixed value), and the transmission power threshold Tr is decreased by a correction amount equal to $\Delta Tr$ (which is a small fixed value). If $N_{AVE}$ is smaller than TRMIN, i.e., if average $N_{AVE}$ has improved due to a small number of Nack occurrences, the interference power correction value β is decreased by a correction amount equal to $\Delta Tr$ (which is a small fixed value), and the transmission power threshold Tr is increased by a correction amount equal to $\Delta Tr$ (which is a small fixed value).

With this arrangement, the interference power correction value β and the transmission power threshold Tr can be optimized.

Further, the present invention is not limited to these embodiments, but various variations and modifications may be made without departing from the scope of the present invention.

What is claimed is:

1. A radio base station for performing communication through three or more frequency bands based on orthogonal frequency division multiplexing, comprising:
    a transmission unit configured to transmit a first channel
        through at least one of the three or more frequency bands and to transmit a second channel having smaller power than the first channel through at least another one of the three or more frequency bands, the first channel and the second channel being transmittable concurrently in time;

a reception condition detecting unit configured to detect a reception condition of one or more mobile stations residing within a local cell; and a scheduling unit configured to select one of the first channel and the second channel, a modulation scheme, and a transmission power to be used for at least a downlink to one of the mobile stations based on the detected reception condition, wherein a transmission power of the first channel is highest among all channels using the three or more frequency bands, and a frequency band of the highest channel transmission power for transmitting the first channel is selected from the three or more frequency bands and fixedly allocated to the local cell, such that the selected frequency band is different from a frequency band of a highest channel transmission power allocated to any one of a plurality of adjacent cells, and wherein a transmission power of the second channel does not exceed a predetermined interference power value tolerable to an adjacent cell.

2. The radio base station as claimed in claim 1, wherein the scheduling method includes:

a table indicating modulation schemes corresponding to respective indexes indicative of reception conditions; and a table searching unit configured to select the modulation scheme by finding one of the modulation schemes corresponding to the reception condition of said one of the mobile stations.

3. The radio base station as claimed in claim 2, wherein the scheduling unit is configured to allocate the first channel to a mobile station whose reception condition of the second channel is worse than a channel threshold and to allocate the second channel to a mobile station whose reception condition of the second channel is better than or equal to the channel threshold.

4. The radio base station as claimed in claim 3, wherein the scheduling unit is configured to allocate a remaining first channel to a mobile station whose reception condition of the second channel is better than or equal to the channel threshold, the remaining first channel being what is left after allocating first channels to mobile stations whose reception condition of the second channel is worse than the channel threshold.

5. The radio base station as claimed in claim 3, wherein the scheduling unit includes a transmission power limiting unit configured to limit a transmission power used by the mobile station to which the second channel is allocated, such that the transmission power does not exceed a transmission power threshold.

6. The radio base station as claimed in claim 5, wherein the transmission power limiting unit includes a modulation scheme changing unit configured to change the modulation scheme used by the mobile station to which the second channel is allocated to another modulation scheme having a lower encoding ratio when the transmission power used by the mobile station to which the second channel is allocated exceeds the transmission power threshold.

7. The radio base station as claimed in claim 6, wherein the scheduling unit includes:

a compensation value determining unit configured to determine a compensation value for compensating for interference between a first channel of a local cell and a second channel of another cell and between a second channel of a local cell and a first channel of another cell; and a correction unit configured to utilize the compensation value to correct the reception condition of the mobile station to which the first channel is allocated.

8. The radio base station as claimed in claim 7, wherein the correction unit is further configured to utilize the compensation value to correct the modulation scheme and transmission power used by the mobile station to which the second channel is allocated.

9. The radio base station as claimed in claim 8, wherein the compensation value determining unit is configured to increase the compensation value in response to an increase in a packet error rate and to decrease the compensation value in response to a decrease in the packet error rate.

10. The radio base station as claimed in claim 3, wherein the channel threshold value is determined based on a radius of an area covered by the cell and a bandwidth of the second channel.

11. A scheduling method used in a radio communication system for performing communication through three or more frequency bands based on orthogonal frequency division multiplexing, comprising:

transmitting a first channel through at least one of the three or more frequency bands and a second channel having smaller power than the first channel through at least another one of the three or more frequency bands, the first channel and the second channel being transmittable concurrently in time;

detecting a reception condition of one or more mobile stations residing within a local cell; and selecting one of the first channel and the second channel, a modulation scheme, and a transmission power to be used for at least a downlink to one of the mobile stations based on the detected reception condition, wherein a transmission power of the first channel is highest among all channels using the three or more frequency bands, and a frequency band of the highest channel transmission power for transmitting the first channel is selected from the three or more frequency bands and fixedly allocated to the local cell, such that the selected frequency band is different from a frequency band of a highest channel transmission power allocated to any one of a plurality of adjacent cells, and wherein a transmission power of the second channel does not exceed a predetermined interference power value tolerable to an adjacent cell.

12. The radio base station as claimed in claim 1, wherein the scheduling unit is configured to select a communication channel, a modulation scheme, and a transmission power for downlink and uplink to be used by the mobile stations.

* * * * *

UNITED STATES PATENT AND TRADEMARK OFFICE
CERTIFICATE OF CORRECTION

PATENT NO. : 8,010,161 B2  
APPLICATION NO. : 12/200358  
DATED : August 30, 2011  
INVENTOR(S) : Umeda et al.

Page 1 of 1

It is certified that error appears in the above-identified patent and that said Letters Patent is hereby corrected as shown below:

On the Title page add:

Item (30)    Foreign Application Priority Data

Jan 17, 2008            (JP)...............2008-007835

Signed and Sealed this
Twenty-ninth Day of November, 2011

David J. Kappos
*Director of the United States Patent and Trademark Office*